(12) United States Patent
Manchala et al.

(10) Patent No.: US 7,826,076 B2
(45) Date of Patent: Nov. 2, 2010

(54) SYSTEM AND METHOD FOR PROVIDING SECURE VALUE-ADDED DOCUMENT NETWORK SERVICES

(75) Inventors: Daniel W. Manchala, Torrance, CA (US); M. Armon Rahgozar, Penfield, NY (US); Mary Ann Sprague, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 1484 days.

(21) Appl. No.: 09/946,923

(22) Filed: Sep. 5, 2001

(65) Prior Publication Data

US 2003/0043402 A1   Mar. 6, 2003

(51) Int. Cl.
G06F 15/00 (2006.01)
G06K 1/00 (2006.01)

(52) U.S. Cl. ............... 358/1.14; 358/1.13; 358/1.15; 705/78

(58) Field of Classification Search ............... 358/1.15, 358/1.14, 434; 705/64, 78; 380/277, 51; 717/101; 710/220; 713/156, 201, 155, 181, 713/160, 182; 707/500, 1; 726/5; 702/188
See application file for complete search history.

(56) References Cited

U.S. PATENT DOCUMENTS

| | | | |
|---|---|---|---|
| 5,991,469 A | 11/1999 | Johnson et al. | |
| 6,088,119 A | 7/2000 | Manchala et al. | |
| 6,167,358 A * | 12/2000 | Othmer et al. | 702/188 |
| 6,229,620 B1 * | 5/2001 | Makitani et al. | 358/1.15 |
| 6,341,907 B1 | 1/2002 | Katsuyoshi | |
| 6,378,070 B1 * | 4/2002 | Chan et al. | 713/155 |
| 6,385,728 B1 * | 5/2002 | DeBry | 726/9 |
| 6,424,718 B1 * | 7/2002 | Holloway | 380/277 |
| 6,542,261 B1 * | 4/2003 | McGraw | 358/434 |
| 6,628,413 B1 * | 9/2003 | Lee | 358/1.15 |
| 6,718,535 B1 * | 4/2004 | Underwood | 717/101 |
| 6,748,471 B1 * | 6/2004 | Keeney et al. | 710/220 |
| 6,778,289 B1 * | 8/2004 | Iwata | 358/1.15 |
| 6,809,831 B1 * | 10/2004 | Minari | 358/1.15 |
| 6,862,583 B1 * | 3/2005 | Mazzagatte et al. | 705/64 |
| 6,918,042 B1 * | 7/2005 | Debry | 726/5 |
| 6,938,154 B1 * | 8/2005 | Berson et al. | 713/156 |

(Continued)

FOREIGN PATENT DOCUMENTS

JP   2000255144 A   9/2000

(Continued)

OTHER PUBLICATIONS

U.S. Appl. No. 09/376,264, filed Aug. 17, 1999, Manchala et al.

(Continued)

*Primary Examiner*—Edward L Coles
*Assistant Examiner*—Satwant K Singh

(57) ABSTRACT

Systems and methods for performing secure value-added network services in a network using one or more operating systems. The system runs on a distribution agent Web server accessible from one or more types of network Operating Systems ("OS") via a Secure Socket Layer ("SSL") channel. The system includes one or more subsystems, including a receiving system that receives one or more document service requests over a secure communications medium, an authentication system that authenticates each received document service request, a processing system that processes the one or more authenticated document service requests, and a request fulfillment system that fulfills each processed document service request.

36 Claims, 3 Drawing Sheets

U.S. PATENT DOCUMENTS

| | | |
|---|---|---|
| 6,996,235 B2 * | 2/2006 | Foth .............................. 380/51 |
| 7,003,667 B1 * | 2/2006 | Slick et al. .................. 713/182 |
| 7,020,645 B2 * | 3/2006 | Bisbee et al. ................... 707/1 |
| 7,082,538 B2 * | 7/2006 | Bouchard et al. ........... 713/181 |
| 7,190,478 B2 * | 3/2007 | Caffary et al. ............. 358/1.15 |
| 7,256,904 B1 | 8/2007 | Shima |
| 2002/0004800 A1 * | 1/2002 | Kikuta et al. ............... 707/500 |
| 2002/0042884 A1 * | 4/2002 | Wu et al. .................... 713/201 |
| 2002/0054334 A1 * | 5/2002 | Harrison et al. ........... 358/1.15 |
| 2003/0014368 A1 * | 1/2003 | Leurig et al. ................. 705/64 |
| 2003/0028495 A1 * | 2/2003 | Pallante ........................ 705/78 |
| 2004/0111610 A1 * | 6/2004 | Slick et al. .................. 713/160 |

FOREIGN PATENT DOCUMENTS

| | | |
|---|---|---|
| JP | 2000357066 A | 12/2000 |
| JP | 2001195220 A1 | 7/2001 |
| WO | 2001052047 | 7/2001 |

OTHER PUBLICATIONS

U.S. Appl. No. 09/467,631, filed Dec. 20, 1999, Manchala et al.

* cited by examiner

SYSTEM AND METHOD FOR PROVIDING SECURE VALUE-ADDED DOCUMENT NETWORK SERVICES

FIELD OF THE INVENTION

This invention relates generally to network document services and, more particularly, to a method and system for providing secure value-added network document services.

BACKGROUND OF THE INVENTION

Providing document services over networks is well known. In one example, a server receives document service requests from a variety of client machines, such as computer devices, network enabled copier machines, facsimile machines, scanner devices and other multi-function devices. Each of the machines, however, may use one or more different security infrastructures running on their respective operating systems. Since the server may not be preprogrammed to understand all of the different types of security mechanisms utilized by each of the client machines, each of the machines' respective security mechanisms may not be fully utilized. Therefore, in order for the server to communicate with the client machines to provide them with document services, the client machines' operating system's security features must be disabled.

Document service requests and associated documents transmitted through a network to the server in this example are at risk of being intercepted, viewed and/or modified by unauthorized persons. Also, when the server in this example receives such document service requests, the requests may include one or more Quality of Service ("QoS") selections. QoS selections are specific options a user may request for the document services. The server fulfills the request and outputs the requested actions using one or more server-side machines, including facsimile machines, computer devices or storage facilities. For example, a QoS selection may include a user's request that a document be printed using a server-side printer on a special type of paper. Further, a QoS selection may include payment information such as a credit card number. Again, since the server is unable to utilize the security features provided by the various operating systems of the client-side machines, the security of the document service transactions are vulnerable to being compromised.

In particular, authentication of users to a network is often performed in distributed operating systems. For example, authenticating a user of a computer operating in a Windows® environment to a Windows® server through a network is well established. In contrast, authenticating a user across different operating systems ("Cross-OS") could present significant challenges. Cross-OS authentication would require separate authentication methods between each pair of computers using one or more operating systems. This could result in numerous variations, however, of the same basic routine, increasing the size of the code required to perform the authentication and also increasing the probability of errors. Moreover, authentication over public networks (e.g., Internet), including homogenous and heterogenous networks, is difficult because of the potentially different scalabilities of the various operating systems operating on the network. Examples include a customer's client workstation and a vendor's server workstation operating on the same network. Therefore, it is readily apparent that a need exists for providing secure document services, including any QoS selections, for client-side machines using one or more types of operating systems.

SUMMARY OF THE INVENTION

A distribution agent system for providing secure value-added document network services in a network using one or more operating systems in accordance with the present invention includes a receiving system that receives one or more document service requests over a secure communications medium, each of the document service requests being associated with at least one quality of service selection, an authentication system that authenticates each received document service request, a processing system that processes the one or more authenticated document service requests, and a request fulfillment system that fulfills each processed document service request.

A method and a program storage device readable by a machine and tangibly embodying a program of instructions executable by the machine for providing secure value-added document network services in a network using one or more operating systems in accordance with the present invention include receiving one or more document service requests over a secure communications medium, each of the document service requests being associated with at least one quality of service selection, authenticating each received document service request, processing the one or more authenticated document service requests, and fulfilling each processed document service request.

The present invention provides a number of advantages, including using non-operating system and non-application user authentication information on a client-side with the authentication information being used in the network and the server-side without the need to manually set up user/password information with the aid of a system administrator, for example. In addition, QoS selections are obtained using information received over a secure channel for the rightful authenticated users. Still further, the present invention may be used in a number of network environments and makes use of the security features available in a number of server systems to perform authentication at the operating system level.

DETAILED DESCRIPTION OF THE INVENTION

Figure 1:
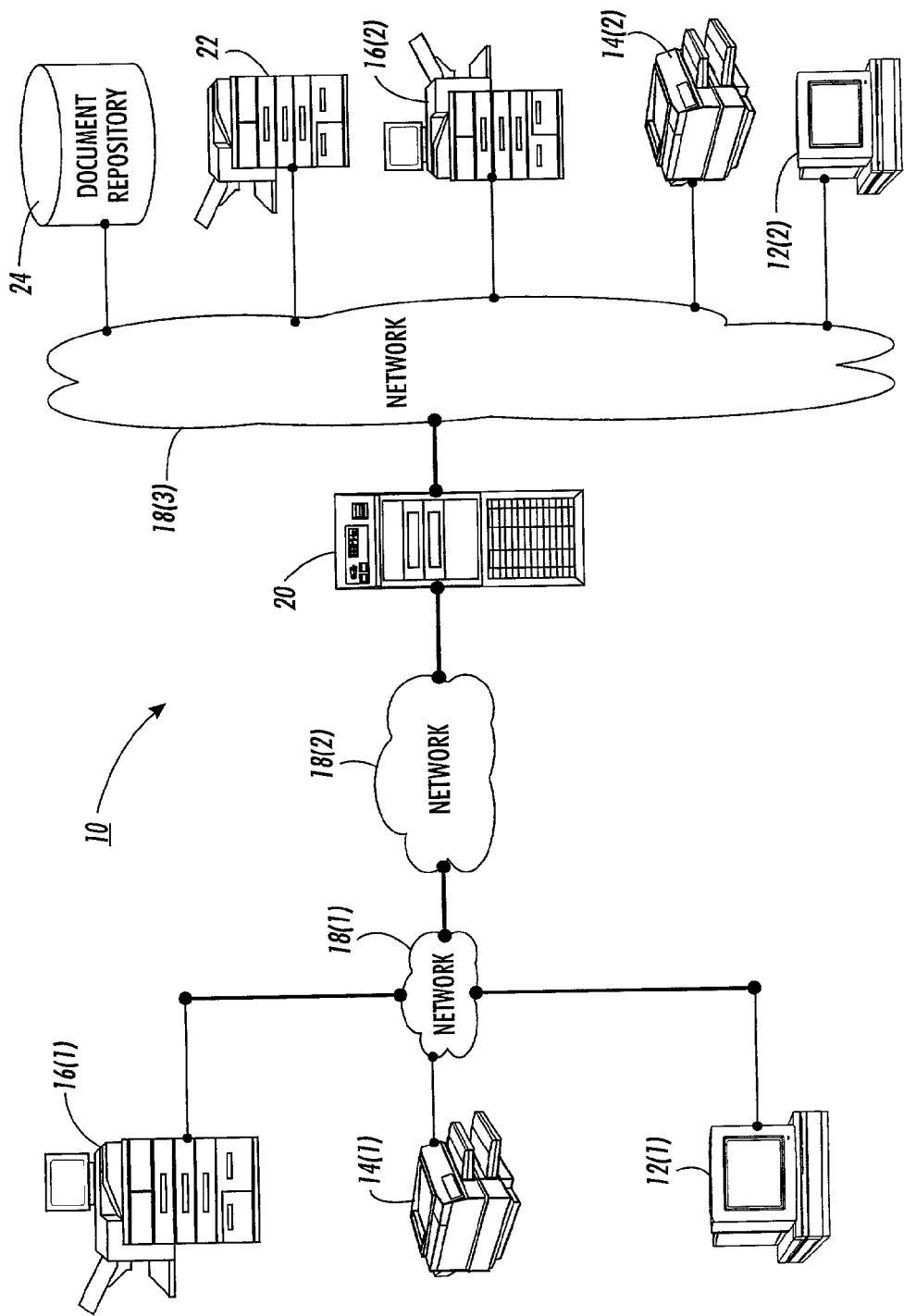
FIG. 1 is a diagram of a system for providing secure value-added document network services in accordance with one embodiment.

A system 10 for providing secure value-added network services in a network using one or more operating systems in accordance with one embodiment of the present invention is shown in FIG. 1. System 10 includes personal computers 12(1), 12(2), facsimile machines 14(1), 14(2), file servers 16(1), 16(2), networks 18(1)-18(3), distribution agent 20, network printer 22 and document repository 24, although system 10 could comprise other types and numbers of systems and devices. A method in accordance with one embodiment includes distribution agent 20 receiving from personal computer 12(1) one or more document service requests over a secure communications medium, authenticating each received document service request, processing the one or more authenticated document service requests, and using network printer 22 to fulfill each processed document service request. The present invention utilizes a secure communications medium (i.e., an SSL channel) and TCP/IP to ensure secure document network services. Further, the present invention uses non-operating system and non-application user authentication information with the authentication information being used in the secure communications medium without the need to manually set up user/password information with the aid of a system administrator, for example. The present invention also provides secure document services and QoS options for authenticated users. Still further, the present invention makes use of security features available in distribution agent 20 on network 18 to perform authentication of client systems at an operating system level.

Referring more specifically to FIG. 1, personal computer 12(1), facsimile machine 14(1), and file server 16(1) are coupled to each other by way of network 18(1), and are also coupled to distribution agent 20 by way of network 18(2). Additionally, personal computer 12(2), facsimile machine 14(2), and file server 16(2), network printer 22 and document repository 24 are coupled to each other and to distribution agent 20 by way of a network 18(3). In other embodiments, each of personal computers 12(1), 12(2), facsimile machines 14(1), 14(2), file servers 16(1), 16(2), network printer 22 and document repository 24 could be coupled directly to distribution agent 20.

In this particular embodiment, personal computers 12(1) and 12(2) each include one or more processors (not illustrated), one or more memory storage devices (not illustrated), one or more input/output interfaces, such as modems (not illustrated), one or more user input devices (not illustrated), and one or more display devices which are coupled to each other via one or more buses (not illustrated), although the types and numbers of components can vary as needed. Since the components, the connections between components and their operation in a personal computer are well known in the art, they will not be described in detail here. Personal computers 12(1) and 12(2) may each utilize one or more types of operating systems including, for example, Linux®, Windows®, MacIntosh®, UNIX®, SunOS®, and equivalents thereof. Personal computers 12(1) and 12(2) may also access network 18 in a variety of ways, including using a conventional dial-up connection, xDSL or ISDN connection, for example. Additionally, personal computers 12(1) and 12(2) may each use conventionally known e-mail applications to generate, send, receive or display e-mail messages, including Microsoft Outlook®, Eudora® or AOL®, for example. Further, personal computers 12(1) and 12(2) are capable of sending or receiving e-mail in various formats, such as in the MIME or S/MIME protocol. Personal computers 12(1) and 12(2) may also retrieve, load and display Web pages using conventionally known Web browsers such as Microsoft's Internet Explorer®, Netscape® or AOL®, for example.

Facsimile machines 14(1) and 14(2) each comprise a device that can send and receive facsimile transmissions containing text in this embodiment. Since the components, the connections between components and their operation in facsimile machines 14(1) and 14(2) are well known in the art, they will not be described in detail here.

File servers 16(1) and 16(2) each comprise a device that can store, manage and provide access to files and directories in this embodiment. Since the components, the connections between components and their operation in file servers 16(1) and 16(2) are well known in the art, they will not be described in detail here.

In this particular embodiment, networks 18(1) and 18(3) comprise intranet connections and network 18(2) comprises an Internet connection, although other types of network arrangements could be used. For example, networks 18(1) and 18(3) could comprise a local area network ("LAN"), such as an Ethernet®, developed by the assignee of the present application, which is incorporated by reference herein in its entirety, a wide area network ("WAN"), a dial-up connection through a public branch exchange ("PBX") or wireless communication technology could be used. Networks 18(1) and 18(2) have the appropriate firewalls to control access. Network 18(1) may also comprise an Internet service provider ("ISP") (e.g., AOL), to provide a connection to network 18(2). In this particular embodiment, network 18(3) forms a LAN with personal computer 12(2), facsimile machine 14(2), file server 16(2) document repository 24, and distribution agent 20, although other network arrangements could be used, such as a WAN. In this example, file server 16(1) would fulfill a server role to therefore provide personal computer 12(2), facsimile machine 14(2), file server 16(2), network printer 22 and document repository 24 with access to network 18(2).

Network printer 22 comprises a device that can print text and/or graphics on paper in this embodiment. Since the components, the connections between components and their operation in a network printer 22 are well known in the art, they will not be described in detail here. In this embodiment, network printer 22 is capable of receiving document service requests from distribution agent 20.

Figure 2:
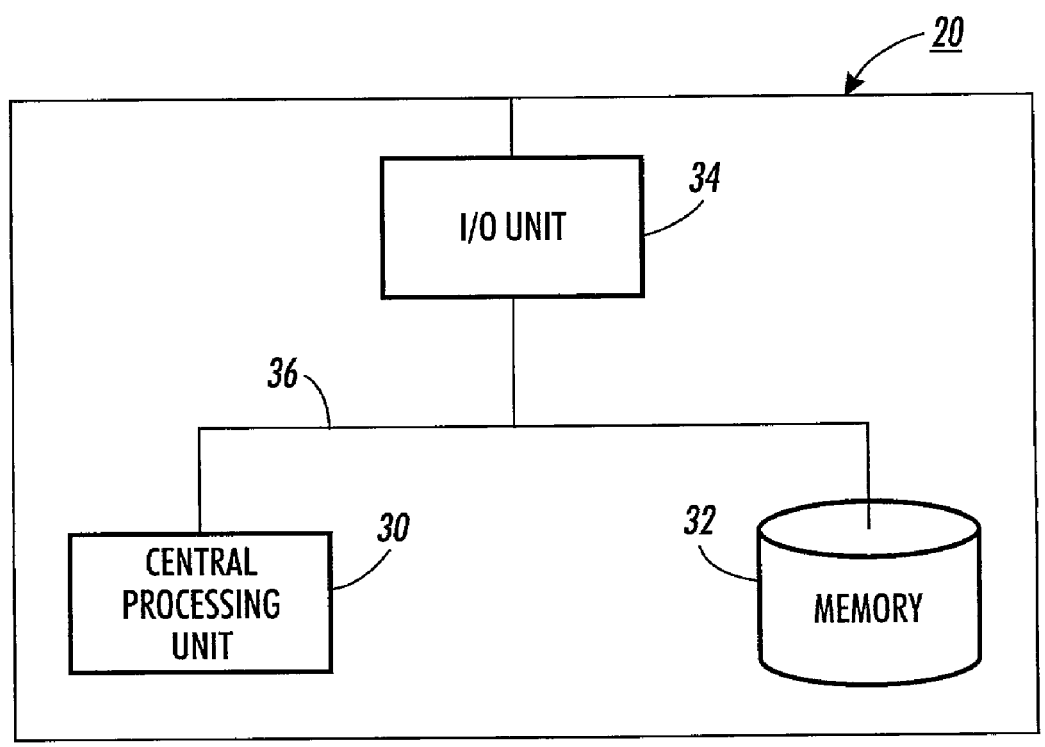
FIG. 2 is a block diagram of a distribution agent used in a system for providing secure value-added document network services.

Referring to FIG. 2, in this particular embodiment distribution agent 20 comprises a central processing unit ("CPU") 30, such as an Intel Pentium III® processor, memory 32 and I/O unit 34, which are coupled together by a bus 36, although the distribution agent 20 can comprise other types and numbers of components.

CPU 30 executes at least a portion of the stored programmed instructions for a method of providing secure value-added document network services in a network using one or more operating systems in accordance with the present invention as described and illustrated herein. CPU 30 may also execute instructions for other tasks, including network services for providing data, memory, file directories, individual files, word processing applications, accounting applications or engineering applications. The programmed instructions may be expressed as executable programs written in a number of computer programming languages, such as BASIC, Pascal, C, C++, C#, Java, Perl, COBOL, FORTRAN, assembly language, machine code language or any computer code or language that may be understood and performed by the CPU 30. CPU 30 also executes instructions for one or more operating system environments, such as UNIX®, although other types of operating systems could be used.

In this particular embodiment, memory 32 stores the programmed instructions mentioned above, although some or all of the programmed instructions could be stored elsewhere in system 10. Memory 32 may comprise any type of memory device accessible by the CPU 30, such as ferroelectric memory, read only memory ("ROM"), random access memory ("RAM"), electrically erasable programmable read only memory ("EEPROM"), erasable programmable read only memory ("EPROM"), flash memory, static random access memory ("SRAM"), dynamic random access memory ("DRAM"), ferromagnetic memory, charge coupled devices, or any other type of computer-readable mediums. Memory 32 may also comprise a portable memory device, such as a floppy-disk, hard-disk, Zip® disk, Compact Disk ("CD"), Digital Video Disk ("DVD"), computer-readable cassette tapes or reel, magnetic tape, optical disk, smart card or computer-readable punch card along with an associated read and/or write system.

I/O unit 34 is used to couple distribution agent 20 to other systems and devices, such as personal computer 12(1) through networks 18(1) and 18(2) and also with network printer 22. 1/0 unit 34 may comprise a router such as any type of Ethernet® based device having sufficient ports to operatively couple distribution agent 20 to network 18, and hence, personal computer 12(1) and network printer 22. In other embodiments, I/O unit 34 has enough ports to also operatively couple distribution agent 20 to facsimile machine 14(1) and file server 16(1), and to personal computer 12(2), facsimile machine 14(2), file server 16(2) and document repository 24.

In this embodiment, distribution agent 20 comprises a Microsoft IIS® Web server, but may comprise a WebSphere®, Apache® or Netscape® server. In another embodiment, distribution agent 20 may comprise any type of device or system that can store, process and execute instructions, or any type of device or system that is hard-wired to execute instructions for performing one or more methods of the present invention as described further herein. In this embodiment, the present invention makes use of the security features available in the distribution agent 20 to perform authentication at the operating system level of personal computer 12(1) as described further herein. Also in this embodiment, distribution agent 20 has the SSL option enabled. In other embodiments, regardless of the type of server used, distribution agent 20 uses the authentication service with the underlying operating system (e.g., Windows 2001) security features of personal computer 12(1). In an embodiment where distribution agent 20 does not use the security features of the underlying operating system of personal computer 12(1), CGI scripts or Java servlets may be used by distribution agent 20 as an authentication client to handshake with the security features of personal computer 12(1). In such an embodiment, while personal computer 12(1) would be authenticated, there could be network 18 resources that would impose different requirements and may need additional programming to provide access to personal computer 12(1).

Figure 3:
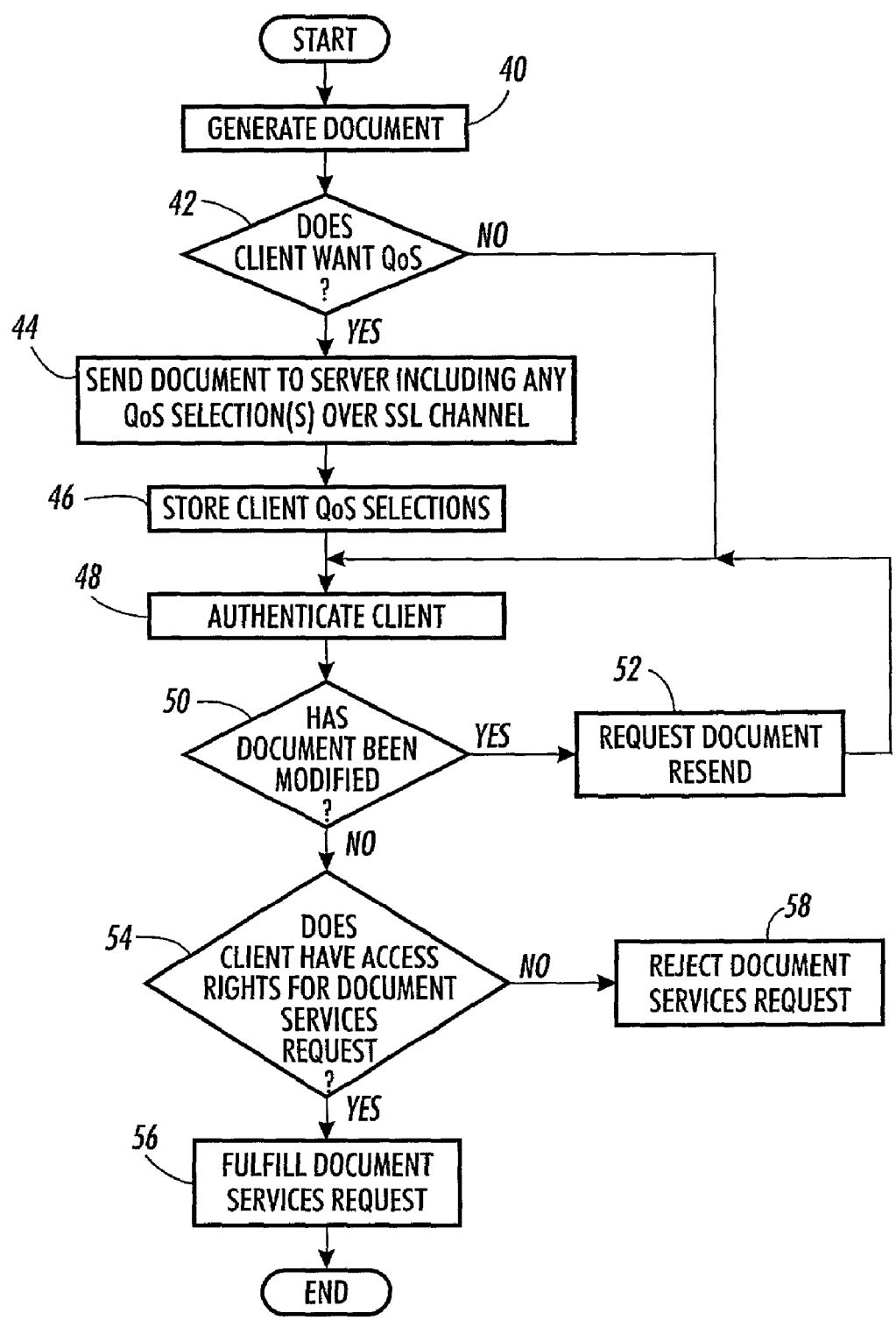
FIG. 3 is a flowchart of a process for providing secure value-added document network services.

Referring to FIG. 3, the basic operation of system 10 for providing secure value-added document network services in accordance with one embodiment of the present invention will now be discussed. In this and other embodiments, while generated documents and users are often referred to in the singular form, generated documents and users may comprise one or more documents and users, respectively, as described further herein below.

At step 40, a user at personal computer 12(1) generates a document using a word processing program such as Microsoft Word®, for example. Alternatively, the user at personal computer 12(1) in this embodiment may already have the generated document, either having received it attached to an e-mail message or having previously stored it in a memory storage associated with the personal computer 12(1). The user at personal computer 12(1) may wish to request to have document services with associated QoS selections performed on the generated document. In this embodiment, the user at personal computer 12(1) may want the generated document to be printed out remotely using network printer 22. The user may access distribution agent 20 in this embodiment to request document services by loading and displaying a Web page interface received by personal computer 12(1) through network 18 from distribution agent 20. The Web page interface may provide the user at personal computer 12(1) with several options relating to the document services available for the generated document.

Next at step 42, the user is presented with the option of whether they would like to select any QoS options. In particular, the user at personal computer 12(1) may select one or more QoS options associated with the generated document. If the user at personal computer 12(1) desires one or more QoS options, the YES branch is followed in this embodiment and personal computer 12(1) displays the particular QoS options available as they are received from distribution agent 20. In this particular embodiment, the QoS selections may comprise a particular printing quality desired for the generated document, a particular type of paper to be used for printing the generated document, a print quality level for the generated document, whether the generated document should be assigned a higher priority in terms of the order it is printed in with respect to any other pending document service requests at distribution agent 20, a desired time upon which the document service request will be processed by, whether human verification of the printed generated document is desired, or whether color or black-and-white printing of the generated document is desired. However, if the user in step 42 does not make any QoS selections, the NO branch is followed and step 48 is performed as described further herein. If the user in step 42 makes one or more QoS selections, the YES branch is taken to step 44. In another embodiment, the user may not desire any QoS selections, but may still send their document service requests securely to distribution agent 20 using the SSL channel as described herein.

At step 44, a user at personal computer 12(1) transmits by way of network 18 the user's document service request, including the generated document and associated QoS selections, which are received by distribution agent 20. In this particular embodiment, the document service request and associated QoS selections transmitted from personal computer 12(1) are transmitted over the SSL channel through network 18 as established by distribution agent 20. Distribution agent 20 causes personal computer 12(1) to use the SSL channel over network 18 by providing personal computer 12(1) with access to it only through the SSL channel (e.g., HTTPS). It should be noted that when the user at personal computer 12(1) makes their respective QoS selections, they may be required by distribution agent 20 to pay a fee in order to make particular selections or to upgrade existing selections. Moreover, since a monetary transaction is involved, it may be desirable to encrypt the document service request and associated QoS selections. Since personal computer 12(1) and distribution agent 20 are communicating over the SSL channel, the document service requests, associated documents and QoS selections are encrypted. In this particular embodiment, DES with RSA public key encryption is used. However, it should be understood that in other embodiments, any type of public key encryption algorithm combined with a symmetric key algorithm (e.g., DES RC4) may be used.

Next at step 46, distribution agent 20 stores the document service request, any associated QoS selections and the associated generated document in memory 32.

Next at step 48, distribution agent 20 authenticates the user at personal computer 12(1) associated with the document service request. In this particular embodiment, distribution agent 20 authenticates the document service request and associated QoS selections by determining whether the generated document associated with the document service request has been modified at decision box 50. If at decision box 50 distribution agent 20 determines that the generated document associated with the document service request has been modified, the YES branch is followed and distribution agent 20 requests personal computer 12(1) to resend the generated document at step 52. Once the resent document is received by distribution agent 20, step 48 is repeated until the generated document is determined by distribution agent 20 to not have been modified, although time-out exceptions may be provided, and the NO branch of decision box 50 may be followed. Time out exceptions may include repeating step 48 a limited number of times, such as five times, until the user has been successfully authenticated. In this example, once the time out exception has expired, the document service request may be rejected by distribution agent 20.

Next at decision box 54, distribution agent 20 determines whether the user at personal computer 12(1) who made the document service request is indeed authorized to make such requests or that the generated document associated with the document services request has not been corrupted. The generated document may be corrupted by being intercepted and altered by an unauthorized third party or by network transmission errors, for example. The YES branch of decision box 54 is followed if distribution agent 20 determines that the user is authorized and the generated document has not been corrupted. If distribution agent 20 determines at decision box 54 that the user at personal computer 12(1) is not authorized or that the document has been corrupted, however, the NO branch is followed and distribution agent 20 rejects the document service request at step 58. The user at personal computer 12(1) may then restart the process described herein beginning at step 40.

Next at step 56, distribution agent 20 fulfills the document service request and associated QoS selections. Distribution agent 20 determines which device in system 10 is best suited to fulfill the document service request. In this embodiment, since the user at personal computer 12(1) desires to print the generated document associated with the document service request, distribution agent 20 therefore determines that network printer 22 would be the most suitable fulfillment means. Network printer 22 fulfills the document service request by printing the generated document using the particular type of paper in the order specified by the assigned priority, and using the requested print quality, for example, according to the QoS selections associated with the document service request. After the generated document is printed, it may be distributed to the intended recipients. For instance, in this embodiment, humans may physically deliver the generated document to the recipients. Mail courier services, such as the U.S. Post Office or Federal Express®, for example, may be used to deliver the generated document.

In this embodiment, the document service requests are fulfilled according to the QoS selections associated with the generated document. For example, if the QoS selections include a request for a human to verify that the generated document was successfully printed, a human would physically inspect the generated document prior to delivering it to the recipients. In this example, the human inspection would include verifying that the printed generated document has a sufficient toner level, a sufficient color quality, the correct number of pages, or that the processing priority status has been correctly fulfilled.

In another embodiment of the present invention, steps 40-56 are performed as explained above, except that at step 56 distribution agent 20 determines that based upon the document service request, the document repository 24 would be the best suited device to fulfill the document service request. Thus, in this embodiment document service requests are fulfilled at document repository 24. Document repository 24 may comprise one or more memory storages located within the same physical location as distribution agent 20 or at another physical location. In an embodiment where document repository 24 is located at another physical location, it may be situated within a server as described above (e.g., distribution agent 20). Further, document repository 24 in this example may comprise one or more databases capable of storing generated documents sent from distribution agent 20 in electronic format. In particular, the generated document 40 is stored electronically at document repository 24 for subsequent retrieval. Also in this embodiment, documents may still be printed using network printer 22 and delivered to their intended recipients as described above.

In another embodiment of the present invention, the same steps are performed for providing secure value-added document network services as described above in connection with steps 40-56, except that facsimile machine 14(1) is used instead of personal computer 12(1) and facsimile machine 14(2) is used instead of network printer 22 as explained further herein. Thus, requests for document services in this embodiment may include a request for a generated document to be transmitted as a facsimile message to one or more recipients. In this embodiment, facsimile machine 14(1) is capable of sending document service requests to distribution agent 20 through network 18. Also, in this embodiment, facsimile machine 14(1) may be operatively coupled to distribution agent 20 in any of the ways described above with respect to personal computer 12(1). In this particular embodiment, facsimile machine 14(1) transmits a facsimile message intended to be delivered to one or more recipients. If QoS options are desired for the facsimile transmission, a cover page may be included with the facsimile transmission indicating the QoS selections. Once the intended documents including any associated QoS selections contained in the cover page are scanned in and converted into electronic signals by facsimile machine 14(1), they are transmitted to distribution agent 20 by way of network 18. Thereafter, the same steps as described above in connection with steps 40-56 are performed, except that at step 56 distribution agent 20 determines that based upon the document service request facsimile machine 14(2) would be the best suited device to fulfill the document services request. Distribution agent 20 processes the document service request and associated QoS selections as described above, and forwards the processed generated document to facsimile machine 14(2) to be fulfilled at step 56. Facsimile machine 14(2) then sends a facsimile transmission representing the processed generated document received from distribution agent 20 to the intended recipients.

In yet another embodiment of the present invention, one or more of personal computer 12(1), facsimile machine 14(1) and file server 16(1) may transmit document service requests, which include one or more documents and any associated QoS selections, to distribution agent 20 byway of network 18 as described above in one or more embodiments. Furthermore, one or more of personal computer 12(2), network printer 14(2), file server 16(2), network printer 22 and/or document repository 24 may fulfill the document services request as described above in connection with steps 40-56, and in particular step 56, except that the devices determined by distribution server 20 to be best suited for fulfilling the document service requests are used as appropriate. For instance, if the generated document is sent to file server 16(2) to be fulfilled, then the file server 16(2) may store the documents so that they are available to one or more devices in an embodiment where file server 16(2) is part of a LAN. Alternatively, where distribution agent 20 sends the generated document to personal computer 12(2) to be fulfilled, personal computer 12(2) may store it in its memory storage for use by a user. In this example, the user at personal computer 12(2) may choose to forward the generated document as an e-mail attachment to another device in system 10 or may choose to send it to network printer 22 in an embodiment where they are both part of a LAN. Additionally, the document service request in this embodiment may include a request for the generated document associated with the request to be converted from a first file format to a second file format. For example, if the generated document is in the Microsoft Word® format, the document service request may include a request to convert the one or more documents into a Corel® WordPerfect® format. In this example, distribution agent 20 would include the appropriate filters and instructions (i.e., computer executable code) to enable it to perform the appropriate conversions. Alternatively, personal computer 12(2) or file server 16(2) could include the appropriate filters and instructions to perform the appropriate conversion. Thus, in this example, distribution agent 20 could perform the conversion, or personal computer 12(2) or file server 16(2) could perform the conversion once they receive the generated document from distribution agent 20.

In another embodiment, steps 40-56 are performed concurrently by an ISP and distribution agent 20 to fulfill QoS selections. For example, a QoS selection requesting a faster transmission channel in network 18(1) to transmit document service requests to distribution agent 20 may be included with the document service requests.

Other modifications of the present invention may occur to those skilled in the art subsequent to a review of the present application, and these modifications, including equivalents thereof, are intended to be included within the scope of the present invention. Further, the recited order of processing elements or sequences, or the use of numbers, letters, or other designations therefor, is not intended to limit the claimed processes to any order except as may be specified in the claims.

What is claimed is:

1. A method for providing secure value-added network services in a network including a server and a plurality of client devices, the method comprising:

receiving, by the server, one or more document service requests from one of the client devices to send to at least one other of the plurality of client devices over a secure communications medium, wherein each received document service request is associated with at least one quality of service selection that causes the at least one other of the plurality devices receiving the request to perform, at the receiving device, an output operation related to reproducing the document in a manner specified by the selection;

authenticating, by the server, a sender of each received document service request; and in response to said authenticating, processing the one or more authenticated document service requests to fulfill each of the processed document service requests based upon the associated at least one quality of service selection, wherein the requesting client device and the at least one other of the plurality of client devices each have a different type of computer operating system, and wherein the plurality of client devices includes a personal computer, a file server and a facsimile machine coupled together over the secure communications medium.

2. The method as set forth in claim 1 wherein the one or more document service requests and the at least one associated quality of service selection are encrypted using a public key encryption algorithm and a symmetric key algorithm.

3. The method as set forth in claim 1 wherein the authentication further comprises determining whether the sender is authorized to make the document service request or whether the one or more documents have been modified or corrupted.

4. The method as set forth in claim 1 wherein the processing further comprises identifying the received document service requests as a request for one or more documents to be printed, transmitted as one or more facsimile messages, or converted from a first file format to a second file format.

5. The method as set forth in claim 1 wherein the processing further comprises determining whether the received document service requests are associated with at least one quality of service selection.

6. The method as set forth in claim 5 further comprising identifying the at least one quality of service selection as a request that the documents be assigned a priority rating to determine their processing order, that a quality level of the processed documents be verified by humans, or that the documents be processed by an approximate time.

7. The method as set forth in claim 5 further comprising identifying the at least one quality of service selection as a request that one or more documents be printed in accordance with one or more print quality levels, that a particular type of printing paper be used to print the documents, or that the documents be printed in black-and-white or color.

8. The method as set forth in claim 1 wherein the fulfilling further comprises a human verifying that a processed document has a sufficient toner level, a sufficient color quality, a coffect number of generated pages, or a document processing priority status.

9. The method as set forth in claim 1 wherein the fulfilling further comprises delivering the processed document using the secure communications medium or a physical delivery system.

10. The method as set forth in claim 1 wherein the secure communications medium comprises a secure socket layer channel.

11. The method as set forth in claim 1, comprising determining which of the other of the plurality of client devices is best suited to fulfill each document service request.

12. The method as set forth in claim 1, wherein the sending and receiving devices of the plurality of client devices are facsimile machines.

13. A distribution agent system for providing secure value-added network services in a network including a server and a plurality of client devices, the system comprising:

a receiving system provided with the server for receiving one or more document service requests from one of the client devices to send to at least one other of the plurality of client devices over a secure communications medium, wherein each received document service request is associated with at least one quality of service selection that causes the at least one other of the plurality devices receiving the request to perform, at the receiving device, an output operation related to reproducing the document in a manner specified by the selection;

an authentication system provided with the server for authenticating a sender of each received document service request; and a processing system that processes, in response to said authenticating, the one or more authenticated document service requests to fulfill each processed document service request based upon the associated at least one quality of service selection, wherein the requesting client device and the at least one other of the plurality of client devices each have a different type of computer operating system, and wherein the plurality of client devices includes a personal computer, a file server and a facsimile machine coupled together over the secure communications medium.

14. The system as set forth in claim 13 wherein the one or more document service requests and the at least one associated quality of service requests are encrypted using a public key encryption algorithm and a symmetric key algorithm.

15. The system as set forth in claim 13 wherein the authentication system determines whether a sender of one or more documents associated with the received document service requests is authorized to make the document service request or whether the one or more documents have been modified or corrupted.

16. The system as set forth in claim 13 wherein the processing system identifies the received document service requests as a request for one or more documents to be printed, transmitted as one or more facsimile messages, or converted from a first file format to a second file format.

17. The system as set forth in claim 13 wherein the processing system determines whether the received document service requests are associated with at least one quality of service selection.

18. The system as set forth in claim 17 wherein the processing system further comprises identifying the at least one quality of service selection as a request that the documents be assigned a priority rating to determine their processing order, that a quality level of the processed documents be verified by humans, or that the documents be processed by an approximate time.

19. The system as set forth in claim 17 wherein the processing system further comprises identifying the at least one quality of service selection as a request that one or more documents be printed in accordance with one or more print quality levels, that a particular type of printing paper be used to print the documents, or that the documents be printed in black-and-white or color.

20. The system as set forth in claim 13 wherein the fulfillment system further comprises a human verifying that a processed document has a sufficient toner level, a sufficient color quality, a coffect number of generated pages, or a document processing priority status.

21. The system as set forth in claim 13 wherein the fulfillment system delivers the processed document over the secure communications medium or using a physical delivery system.

22. The system as set forth in claim 13 wherein the secure communications medium comprises a secure socket layer channel.

23. The system as set forth in claim 13, wherein the processing system determines which of the other of the plurality of client devices is best suited to fulfill each document service request.

24. The system as set forth in claim 13, wherein the sending and receiving devices of the plurality of client devices are facsimile machines.

25. A computer readable medium having stored thereon instructions for providing secure value-added network services in a network including a server and a plurality of client devices, causes the processors to perform:

receiving, by the server, one or more document service requests from one of the client devices to send to at least one other of the plurality of client devices over a secure communications medium, wherein each received document service request is associated with at least one quality of service selection that causes the at least one other of the plurality devices receiving the request to perform, at the receiving device, an output operation related to reproducing the document in a manner specified by the selection;

authenticating, by the server, a sender of each received document service request; and in response to said authenticating, processing the one or more authenticated document service requests to fulfill each of the processed document service requests based upon the associated at least one quality of service selection, wherein the requesting client device and the at least one other of the plurality of client devices each have a different type of computer operating system, and wherein the plurality of client devices includes a personal computer, a file server and a facsimile machine coupled together over the secure communications medium.

26. The medium as set forth in claim 25 wherein the one or more document service requests and the at least one associated quality of service requests are encrypted using a public key encryption algorithm and a symmetric key algorithm.

27. The medium as set forth in claim 25 wherein the authentication further comprises determining whether a sender of one or more documents associated with the received document service requests is authorized to make the document service request or whether the one or more documents have been modified or corrupted.

28. The medium as set forth in claim 25 wherein the processing further comprises identifying the received document service requests as a request for one or more documents to be printed, transmitted as one or more facsimile messages, or converted from a first file format to a second file format.

29. The medium as set forth in claim 25 wherein the processing further comprises determining whether the received document service requests are associated with at least one quality of service selection.

30. The medium as set forth in claim 29 further comprising identifying the at least one quality of service selection as a request that the documents be assigned a priority rating to determine their processing order, that a quality level of the processed documents be verified by humans, or that the documents be processed by an approximate time.

31. The medium as set forth in claim 29 further comprising identifying the at least one quality of service selection as a request that one or more documents be printed in accordance with one or more print quality levels, that a particular type of printing paper be used to print the documents, or that the documents be printed in black-and-white or color.

32. The medium as set forth in claim 25 wherein the fulfilling further comprises a human verifying that a processed document has a sufficient toner level, a sufficient color quality, a coffect number of generated pages, or a document processing priority status.

33. The medium as set forth in claim 25 wherein the fulfilling further comprises delivering the processed document over the secure communications medium or using a physical delivery system.

34. The medium as set forth in claim 25 wherein the secure communications medium comprises a secure socket layer channel.

35. The medium as set forth in claim 25, comprising determining which of the other of the plurality of client devices is best suited to fulfill each document service request.

36. The medium as set forth in claim 25, wherein the sending and receiving devices of the plurality of client devices are facsimile machines.

* * * * *